No. 891,162. PATENTED JUNE 16, 1908.
H. L. GUENTHER.
CAN CAPPING AND COMPRESSING MACHINE.
APPLICATION FILED JAN. 18, 1907.

8 SHEETS—SHEET 3.

WITNESSES:
W. M. Avery

INVENTOR
Henry L. Guenther
BY
ATTORNEYS

No. 891,162. PATENTED JUNE 16, 1908.
H. L. GUENTHER.
CAN CAPPING AND COMPRESSING MACHINE.
APPLICATION FILED JAN. 18, 1907.

9 SHEETS—SHEET 4.

WITNESSES:

INVENTOR
Henry L. Guenther
BY
ATTORNEYS

No. 891,162. PATENTED JUNE 16, 1908.
H. L. GUENTHER.
CAN CAPPING AND COMPRESSING MACHINE.
APPLICATION FILED JAN. 18, 1907.

8 SHEETS—SHEET 5.

WITNESSES:
W. M. Avery
Geo. J. Hosted

INVENTOR
Henry L. Guenther
BY Munn & Co
ATTORNEYS

No. 891,162. PATENTED JUNE 16, 1908.
H. L. GUENTHER.
CAN CAPPING AND COMPRESSING MACHINE.
APPLICATION FILED JAN. 18, 1907.

8 SHEETS—SHEET 6.

WITNESSES:
W. M. Avery

INVENTOR
Henry L. Guenther
BY Munn & Co
ATTORNEYS

No. 891,162. PATENTED JUNE 16, 1908.
H. L. GUENTHER.
CAN CAPPING AND COMPRESSING MACHINE.
APPLICATION FILED JAN. 18, 1907.

8 SHEETS—SHEET 7.

WITNESSES
Edward Thorpe.

INVENTOR
Henry L. Guenther
BY Munn & Co
ATTORNEYS

No. 891,162. PATENTED JUNE 16, 1908.
H. L. GUENTHER.
CAN CAPPING AND COMPRESSING MACHINE.
APPLICATION FILED JAN. 18, 1907.
3 SHEETS—SHEET 8.
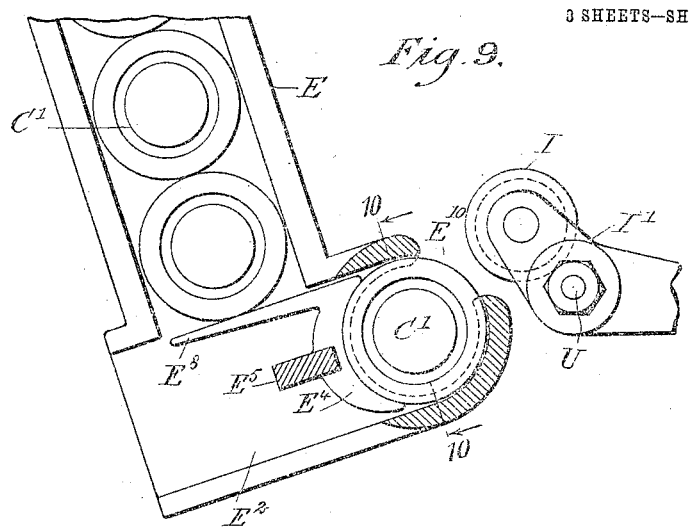
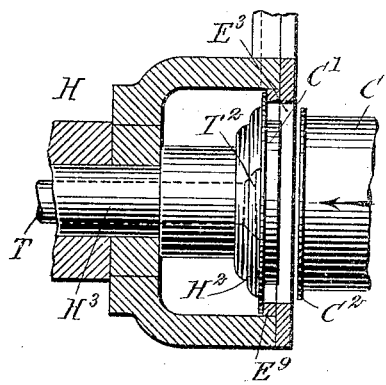
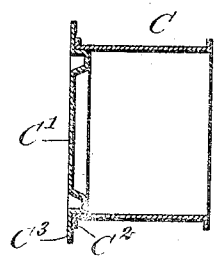
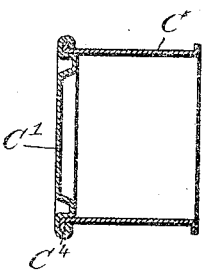
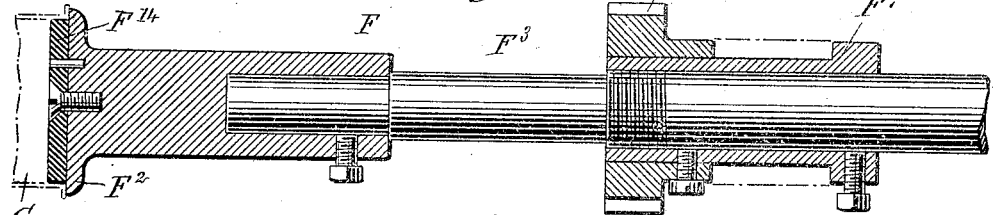
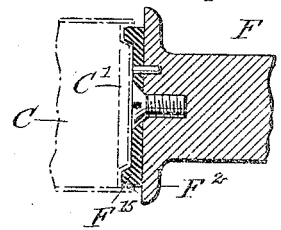
WITNESSES
Edward Thorpe
Geo. G. Hosted
INVENTOR
Henry L. Guenther
BY Munn & Co
ATTORNEYS

UNITED STATES PATENT OFFICE.

HENRY LOUIS GUENTHER, OF ILWACO, WASHINGTON.

CAN CAPPING AND COMPRESSING MACHINE.

No. 891,162.     Specification of Letters Patent.     Patented June 16, 1908.

Application filed January 18, 1907. Serial No. 352,882.

*To all whom it may concern:*

Be it known that I, HENRY LOUIS GUENTHER, a citizen of the United States, and a resident of Ilwaco, in the county of Pacific and State of Washington, have invented a new and Improved Can Capping and Compressing Machine, of which the following is a full, clear, and exact description.

The invention relates to machines for capping and compressing cans, such as shown and described in Letters Patent of the United States, No. 698,701, granted to me April 29, 1902.

The object of the present invention is to provide a new and improved can capping and compressing machine which is simplified in construction, is very effective and wholly automatic in operation, and arranged for capping and compressing the heads on can bodies and double-seaming the flanges to render the can perfectly air-tight, without the use of solder or other fastening means, packings or the like, to permit use of the can in packing various food products.

The invention consists of novel features and parts and combinations of the same, which will be more fully described hereinafter, and then pointed out in the claims.

A practical embodiment of the invention is represented in the accompanying drawings forming a part of this specification, in which similar characters of reference indicate corresponding parts in all the views.

Figure 1:
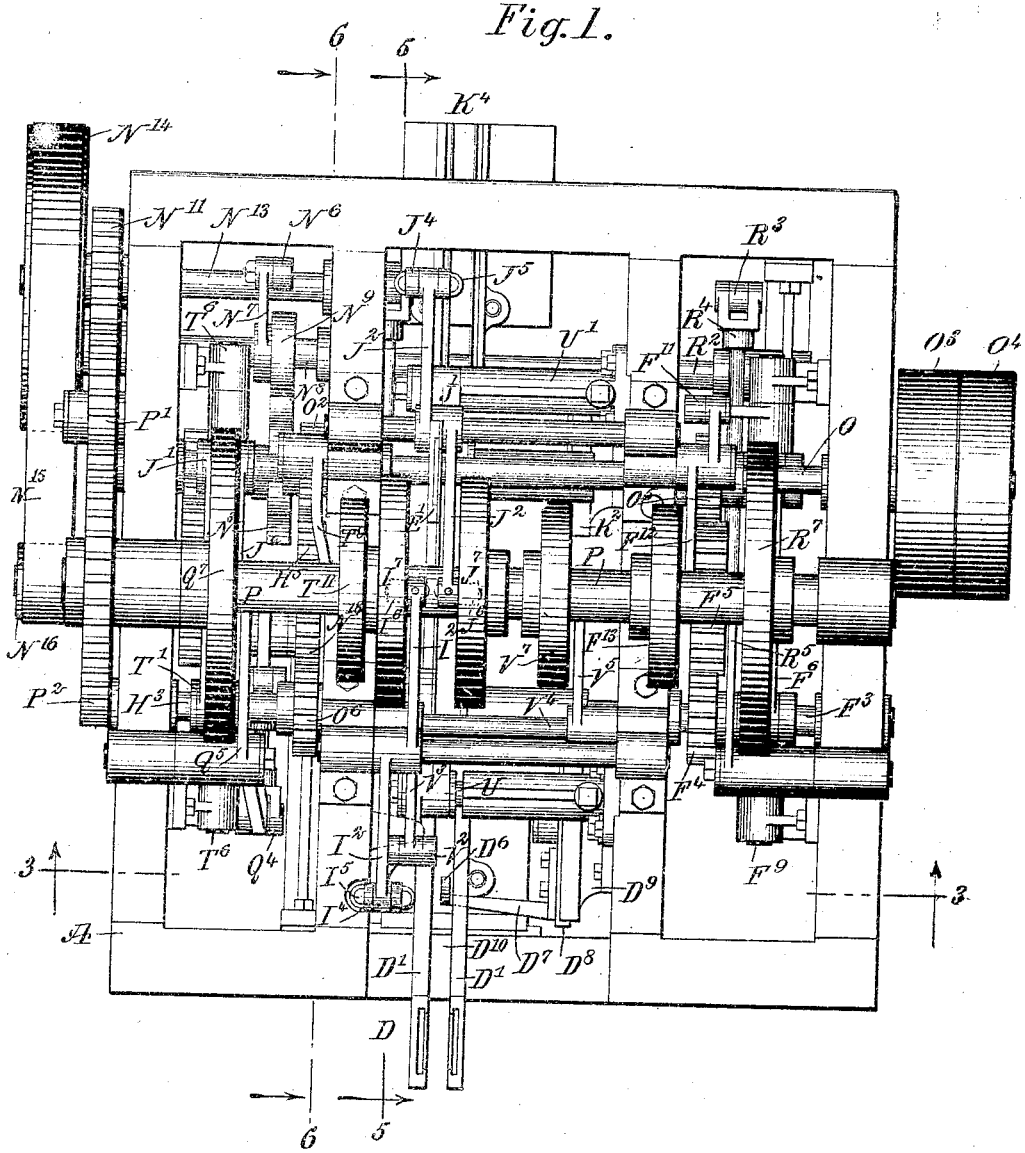
Figure 2:
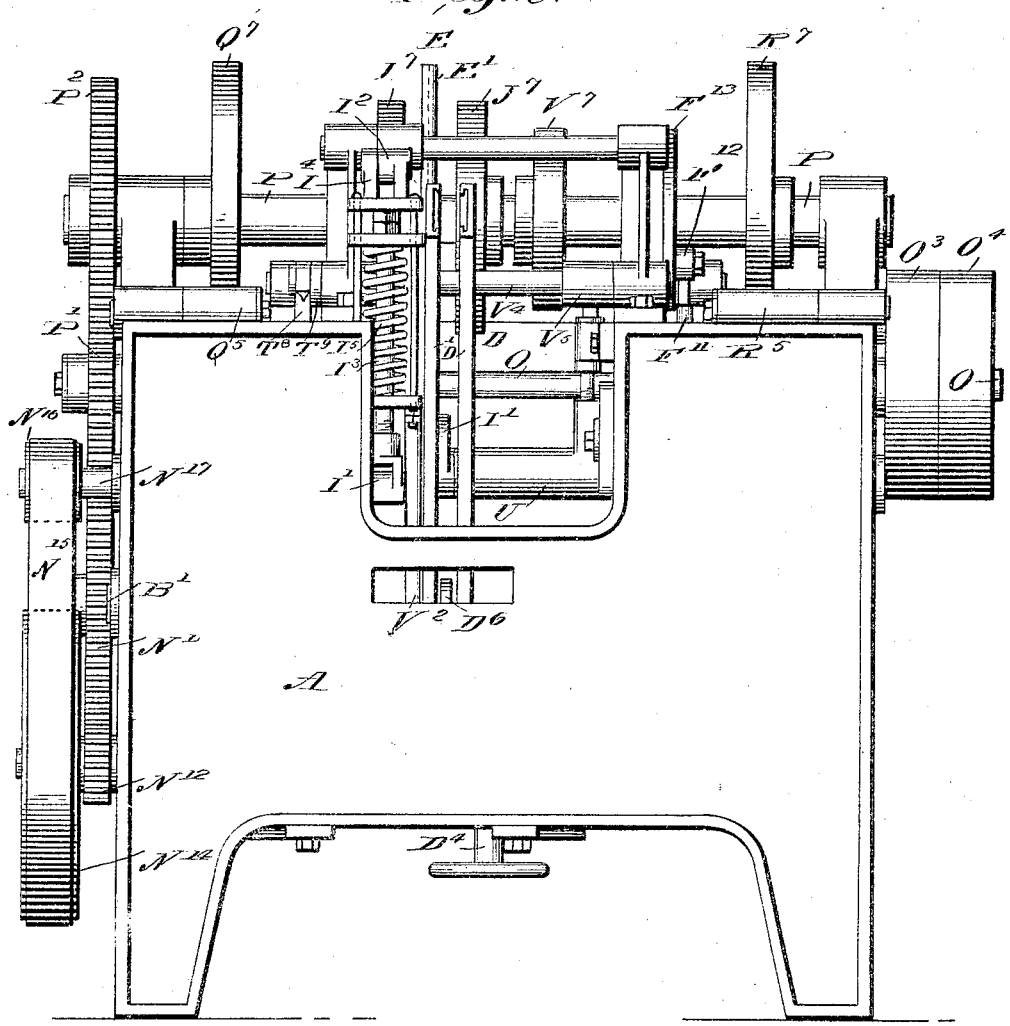
Figure 3:
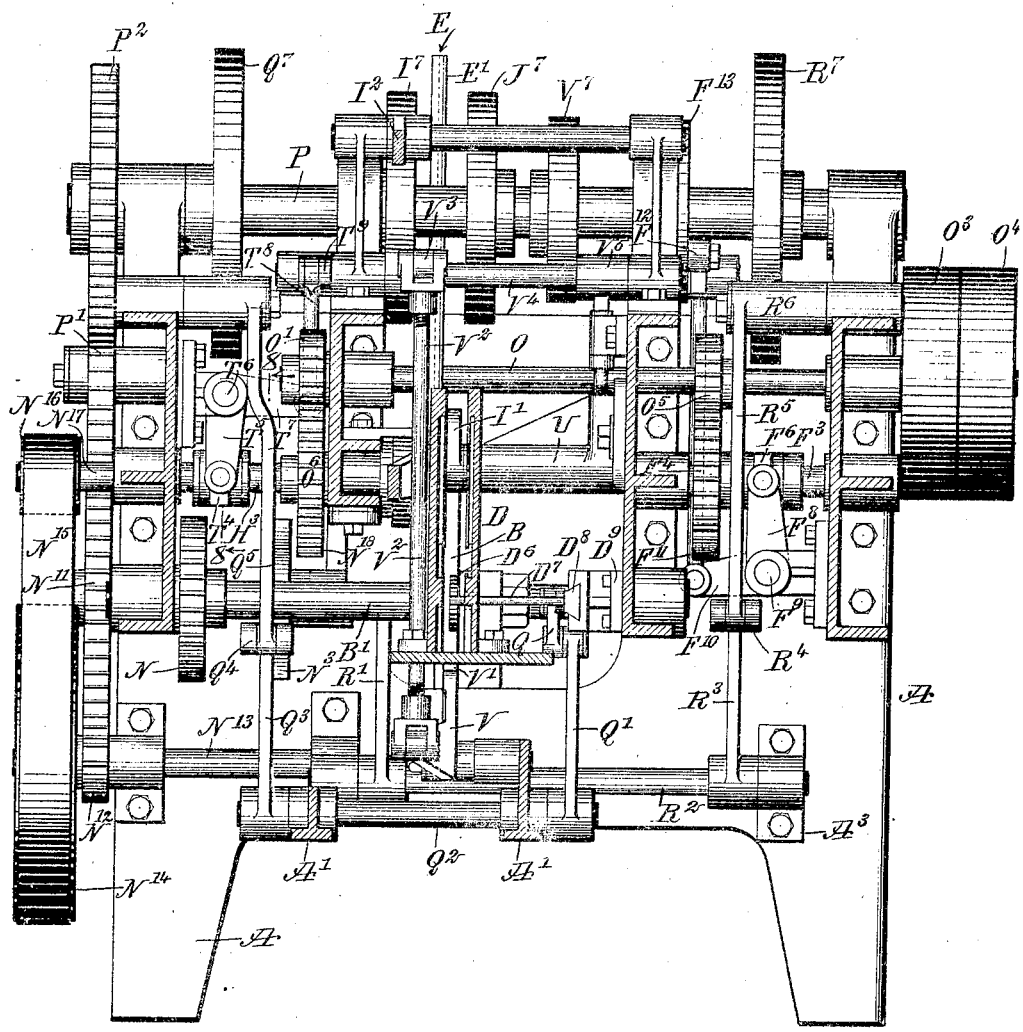
Figure 4:
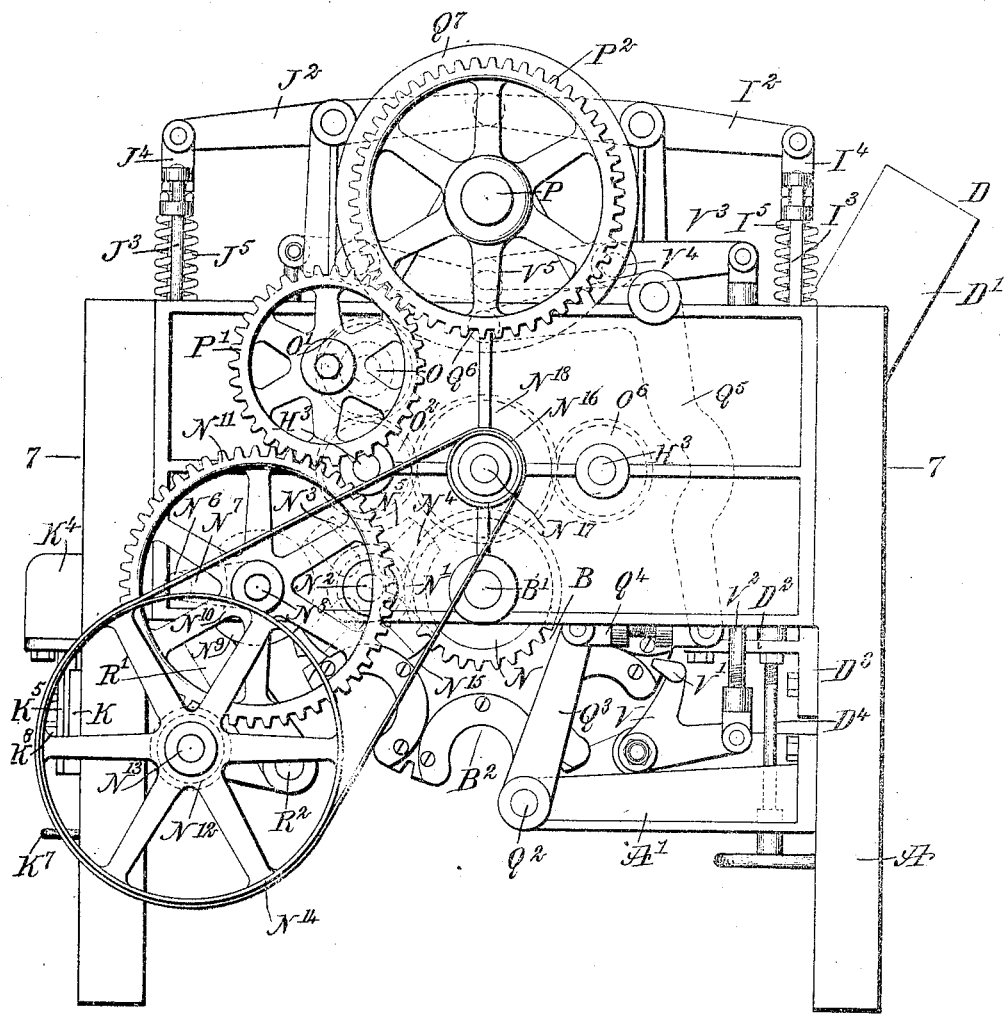
Figure 5:
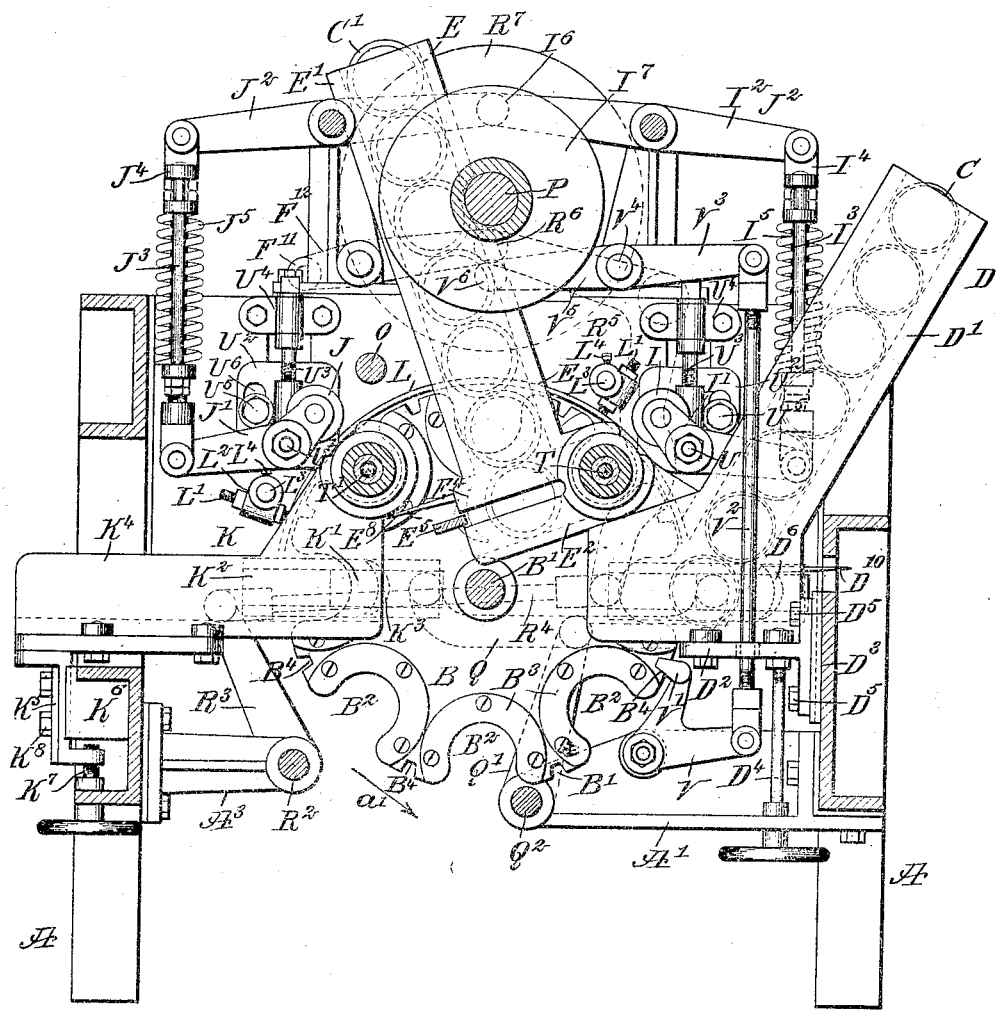
Figure 6:
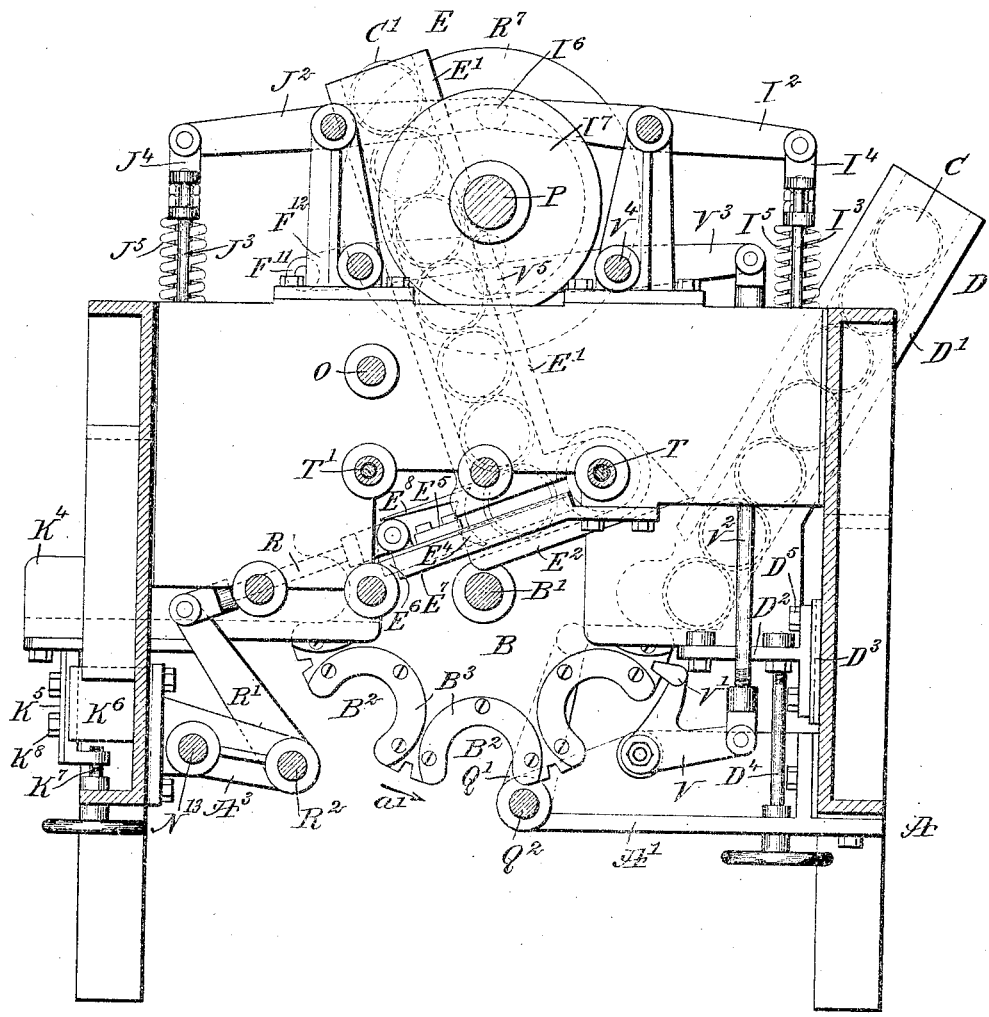
Figure 7:
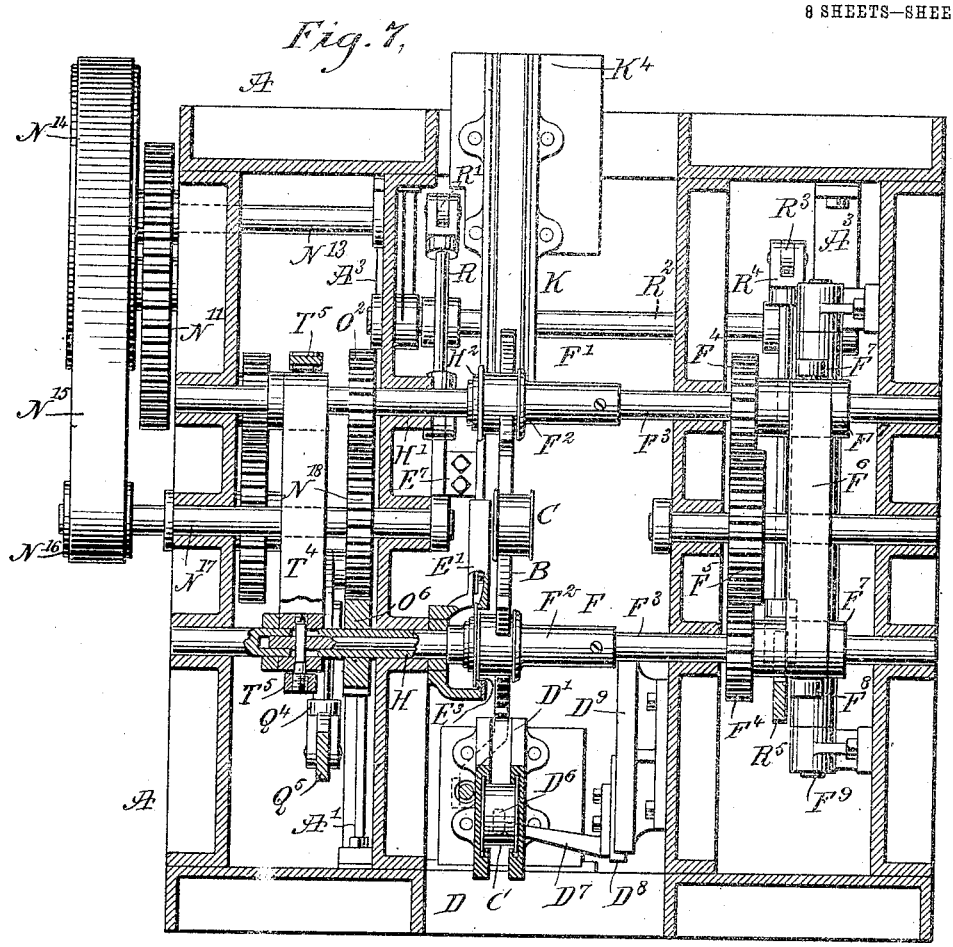
Figure 8:
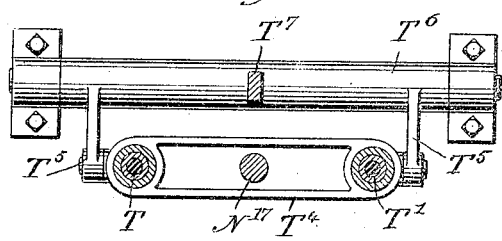

Figure 1 is a plan view of the improvement; Fig. 2 is a front elevation of the same; Fig. 3 is a sectional front elevation of the same on the line 3—3 of Fig. 1; Fig. 4 is a side elevation of the left side of the machine; Fig. 5 is a transverse section of the improvement on the line 5—5 of Fig. 1; Fig. 6 is a similar view of the same on the line 6—6 of Fig. 1; Fig. 7 is a sectional plan view of the improvement on the line 7—7 of Fig. 4; Fig. 8 is a cross section of the shifting mechanism for the push rods, on the line 8—8 of Fig. 3; Fig. 9 is a transverse section of the crimping device; Fig. 10 is an enlarged sectional side elevation, on the line 10—10 of Fig. 9, of the crimping device, showing the can body and head about to be assembled; Fig. 11 is a horizontal section showing the can body and head assembled; Fig. 12 is a similar view, showing the can body and head crimped together; Fig. 13 is a sectional side elevation of a modified form of mandrel; and Fig. 14 is a similar view of another modified form of mandrel.

In the improved machine presently to be described in detail, the can bodies are successively fed by a feed mechanism to a vertically disposed rotating platen, and by a separate feed mechanism can heads are brought to the side of the can bodies and are engaged by a set of rapidly revolving mandrels and spindles to rotate the can body and its head in the platen, so that a crimping roller which now engages the flanges of the assembled can body and its head, forms a double seam, the platen next bringing the crimped can to a second set of rotating mandrels and spindles, to rotate the crimped can and cause a compressing roller to press the double seam, to render the can body completely air-tight. To accomplish this result in a simple manner, I construct the machine as follows: The improved machine is mounted on a suitably constructed frame A, on which is mounted the shaft B' carrying a vertically disposed platen B revolving intermittently in the direction of the arrow $a'$ and having in its periphery notches $B^2$ for receiving and holding a cylindrical can body C, and on the front of the said platen B is arranged a can body feed mechanism D for successively feeding the can body C to the notches $B^2$ in register at the time with the forward end of the said can body feeding mechanism, the said platen after receiving a can body being intermittently rotated to bring the next notch $B^2$ in register with the forward end of the can body feeding mechanism D and to bring the can body in the previous notch $B^2$ in register with a can head feeding device E, for holding a can head C' over the end of the said can body C in the platen B. The registering can body C and its head C' are now located between a rapidly revolving mandrel F and a rapidly revolving spindle H arranged horizontally and in axial alinement with each other, the said mandrel F and spindle H serving to rotate the can body C and its head C' in the platen notch $B^2$ and to subject the flanges $C^2$ and $C^3$ of the body C and the head C', respectively, to a crimping or double seam action by a crimping roller I. The platen B at the next two intermittent movements brings the crimped can between a second set of revolving mandrels F' and spindles H', to rotate the can and subject the double seam $C^4$ to the action of a compressing roller J, to render the same airtight. The platen B finally brings the finished can to an ejecting device K for delivering the can from the machine at the rear side of the platen.

In detail the construction of the machine is as follows: The platen B is provided with eight peripheral notches $B^2$, and each notch is circularly edged and provided with clamping rings $B^3$, having the ends rounded off for the convenient entrance and exit of the can bodies and the finished cans, as hereinafter more fully described. A guard L extends over the top peripheral portion of the platen B to hold the can bodies in the notches $B^2$ of the platen while the same is intermittently rotated and passes from the can body feeding device D to the ejecting device K (see Fig. 5). The guard L is adjustably secured by screw rods L' to heads $L^2$ fastened on rods $L^3$ projecting from the main frame A, suitable set screws $L^4$ serving to fasten the heads $L^2$ in place on the rods $L^3$.

The intermittent rotary motion is given to the platen B by means of an intermittently operating mechanism arranged as follows: On the left hand end of the shaft B' carrying the platen B is secured a spur wheel N in mesh with a pinion N' secured on a short shaft $N^2$ journaled in suitable bearings in the main frame A, and on the said shaft $N^2$ is secured a detent wheel $N^3$ formed with four radial recesses $N^4$, and its peripheral surface is provided with segmental notches $N^5$. The recesses $N^4$ are adapted to be engaged by a friction roller $N^6$ journaled on the free end of an arm $N^7$ secured on a horizontally disposed shaft $N^8$ journaled in suitable bearings on the main frame A. On the shaft $N^8$ is secured a locking disk $N^9$ having a segmental notch $N^{10}$ on its peripheral surface, for engaging the periphery of the detent wheel $N^3$ during the time the friction roller $N^6$ travels in a recess $N^4$. During the time the friction roller $N^6$ is out of a recess $N^4$ the remaining peripheral portion of the disk $N^9$ travels in a segmental notch $N^5$, so as to prevent the detent wheel $N^3$ from accidentally rotating during the period of rest, as shown in Fig. 4.

The shaft $N^8$ is rotated continuously and is provided for this purpose at its left hand end with a gear wheel $N^{11}$ in mesh with a spur wheel $N^{12}$ secured on a shaft $N^{13}$ journaled in suitable bearings on the main frame A. At the left hand end of the shaft $N^{13}$ is secured a pulley $N^{14}$ connected by a belt $N^{15}$ with a pulley $N^{16}$ secured on a shaft $N^{17}$ journaled in suitable bearings in the main frame A. The shaft $N^{17}$ is driven from the main shaft O by gear wheels O', $O^2$ and $N^{18}$ (see Fig. 4), and the right hand end of the driving shaft O is provided with the usual fast and loose pulleys $O^3$, $O^4$ connected by belt with other machinery for imparting a rotary motion to the said main driving shaft O.

The rotation of the latter causes the rotation of the shaft $N^{17}$, which in turn rotates the shaft $N^{13}$ by the pulleys $N^{14}$, $N^{16}$ and the belt $N^{15}$, and the rotary motion of the shaft $N^{13}$ is transmitted by the pinion $N^{12}$ and the gear wheel $N^{11}$ to the shaft $N^8$, which by the arm $N^7$ and the friction wheel $N^6$ intermittently rotates the detent wheel $N^3$ and its shaft $N^2$ connected by the pinion N' and the gear wheel N to the shaft B' of the platen B. Thus when the main shaft O is rotated an intermittent rotary motion is given to the platen B, and the gearing described is so proportioned that when the main shaft O makes one revolution the platen B makes one-eighth of a revolution, so that a succeeding notch B occupies the position the previous notch had, the platen being locked in position during the period of rest by the disk $N^9$, the peripheral surface of which travels in a segmental notch $N^5$ of the detent wheel $N^3$.

The gear wheel $N^{11}$ above mentioned also meshes with an intermediate gear wheel P' (see Fig. 4) in mesh with a gear wheel $P^2$ secured on a cam shaft P journaled in suitable bearings arranged on the top of the main frame A.

The can body feeding mechanism D is next to be considered. This feeding device D is provided with a chute D' down which travel the can bodies C by their own weight, the can bodies being fed into the upper end of the chute by hand or by mechanical means. The lowermost of the can bodies C in the chute D' is pushed out of the chute into the notch $B^2$ in register at the time with the delivery end of the said chute D'. The base $D^2$ of the chute D' is mounted to slide in a guideway $D^3$ secured to or formed on the main frame A, and the said base $D^2$ is engaged by a screw rod $D^4$ mounted to turn in a bracket A' attached to the main frame A. Now when the screw rod $D^4$ is turned by an operator, the chute D' is caused to slide up or down according to the direction in which the screw rod $D^4$ is turned, so that the delivery end of the chute D' is moved into accurate position relative to the platen notches $B^2$, to allow the can body to be readily pushed into the notch $B^2$ registering at the time with the delivery end of the chute D'. After the desired adjustment of the chute D' is made the base $D^2$ thereof is permanently fastened in place on the guideway $D^3$ by tap bolts $D^5$ screwing in the guideway and passing through elongated slots in the base $D^2$.

The lowermost can body C is adapted to be engaged by a transversely reciprocating segmental push head $D^6$ for pushing the said lowermost can body C from the chute D' into the notch $B^2$ registering at the time with the lower end of the chute D'. The push head $D^6$ is secured on the free end of an arm $D^7$ (see Fig. 1) projecting from a slide $D^8$ mounted to slide transversely in guideways $D^9$ secured to the main frame A. The push head $D^6$ is provided at its top with an outwardly extending arm $D^{10}$ (see Fig. 5) adapted to pass under the next can body C above the one pushed out of the lower end of the chute $D'$ at the time, so that the can bodies above the lowermost one are held in position for the time being and until the push head $D^6$ returns to its outermost position, at which time the can bodies C within the chute $D'$ can drop down until the lowermost can body reaches the bottom of the chute $D'$ so as to be in position to be pushed into the next succeeding notch $B^2$ of the platen B.

The slide $D^8$ for the push head $D^6$ is pivotally connected by a link Q with a similar slide $K'$ reciprocating in a guideway $K^2$ secured to the main frame A, and on the slide $K^2$ is secured a push head $K^3$ extending in the delivery guideway $K^4$ and serving to push a finished can out of the corresponding notch $B^2$ registering at the time with the inner or beginning end of the guideway $K^4$ for delivering the finished can to one side of the machine. The delivery guideway $K^4$ is provided with a slide $K^5$ mounted to slide up and down in vertical guideways $K^6$ secured to or formed on the main frame A (see Fig. 5), and the slide $K^5$ is engaged by an adjusting screw rod $K^7$ mounted to turn in bearings on the main frame A. Thus on turning the screw rod $K^7$ the guideway $K^4$ is raised or lowered to bring it in proper position relative to the platen notch $B^2$ carrying the finished can to be ejected by the push head $K^3$. After the desired adjustment of the guideway $K^4$ is made it is permanently fastened in place by tap bolts $K^8$ extending through elongated slots in the slide $K^5$ and screwing in the guideway $K^6$.

The link Q is pivotally connected with the free end of an arm $Q'$ secured on a rock shaft $Q^2$ journaled in suitable bearings carried by the bracket $A'$, and on the said rock shaft $Q^2$ is secured another arm $Q^3$ pivotally connected by a sectional link $Q^4$ with one arm of a bell crank lever $Q^5$ fulcrumed on the main frame A, the other arm of the said bell crank lever $Q^5$ carrying a friction roller $Q^6$ traveling in a cam groove formed on one face of the cam disk $Q^7$ secured on the cam shaft P previously referred to. When the cam shaft P is rotated the cam disk $Q^7$ acts on the friction roller $Q^6$ to impart a swinging motion to the bell crank lever $Q^5$, which by the link $Q^4$ and the arm $Q^3$ rocks the shaft $Q^2$, and the latter by the arm $Q'$ imparts a transverse reciprocating motion to the link Q, which in turn reciprocates the push heads $D^6$ and $K^3$ simultaneously. Normally the push heads $D^6$ and $K^3$ are in the position indicated in Fig. 5, and when the shaft $Q^2$ is rocked then the push head $D^6$ pushes the lowermost can body C out of the chute $D'$ into the notch $B^2$ registering at the time with the lower end of the chute $D'$, and at the same time the other push head $K^3$ pushes a finished can out of the notch $B^2$ registering at the time with the guideway $K^4$. The push heads $D^6$ and $K^3$ then return to their normal position of rest indicated in Fig. 5. The link $Q^4$ is made in sections to allow proper adjustment with the view to bring the push heads $D^6$, $K^3$ in proper relation relative to the can body C and the finished cans.

The can head feeding device E is arranged as follows: The can heads $C'$ pass down a chute $E'$ terminating at its bottom in a lateral chute $E^2$ bolted or otherwise fastened to the main frame A, and the forward end of the said lateral chute $E^2$ has the extreme end of its bottom curved upwardly to form a stop and the chute is provided with side openings $E^3$ in register with the platen notch $B^2$ containing a can body C, so as to bring a can body and a can head in register with each other (see Figs. 9 and 10). The lowermost can head $C'$ in the chute $E^2$ is pushed into the cylinder $E^3$ by the use of a reciprocating push head $E^4$ similar to the push heads $D^6$ and $K^3$ previously referred to, and the said push head $E^4$ is held on an arm $E^5$ secured to a slide $E^6$ mounted to slide in suitable bearings $E^7$ attached to the main frame A (see Fig. 6.) The push head $E^4$ is provided on its top with an outwardly extending arm $E^8$ adapted to pass under the next lowermost can head $C'$ in the chute $E'$, to hold the can heads $C'$ temporarily in position in said chute while the lowermost can head is pushed into the cylinder $E^3$ by the push head $E^4$. When the push head $E^4$ returns to its normal position of rest shown in Fig. 6, then the can heads $C'$ in the chute $E'$ drop and the lowermost can head now passes into the lateral chute $E^2$, to be next pushed into the end of the chute by the push head $E^4$. The slide $E^6$ is pivotally connected by an adjustable link R with an arm $R'$ secured on a rock shaft $R^2$ journaled in suitable bearings $A^3$ attached to the main frame A. On the rock shaft $R^2$ (see Fig. 3) is secured an upwardly extending arm $R^3$ connected by a link $R^4$ with one arm of a bell crank lever $R^5$ fulcrumed on the main frame A, and carrying at its other arm a friction roller $R^6$ (see Fig. 5) in a cam $R^7$ secured on the cam shaft P. Now when the machine is running and the cam shaft P is rotated, the cam $R^7$ and friction roller $R^6$ impart a swinging motion to the bell crank lever $R^5$, which by the link $R^4$ and arm $R^3$ rocks the shaft $R^2$, and the latter by the arm $R'$ and link R reciprocates the slide $E^6$ and consequently the push head $E^4$, for the latter to push the lowermost can head $C'$ into the end of the chute and then return to its normal outermost position of rest as shown in Fig. 6.

The end of the chute is provided in its entrance end with an annular seat $E^9$ (see Fig. 130

10) for the flange $C^3$ of the can head $C'$ to rest on, the opening in the seat being however slightly less in diameter than the diameter of the can body flange $C^2$, to allow the mandrel F to push the can body C into the end of the chute $E^2$ for engaging the can head $C'$. One side of the end of the chute $E^2$ is provided with an opening $E^{10}$ (see Fig. 9) for entrance of the peripheral edge of the crimping roller I to permit of crimping the flanges $C^2$, $C^3$ to form a double seam $C^4$ (see Fig. 12), and which double seam $C^4$ is subsequently compressed by the compressing roller J to form an air-tight seam without the use of solder.

The revolving mandrels F, F' and the spindles H, H' shown in Fig. 7 are similar in construction and operation to the ones shown and described in the Letters Patent of the United States above referred to. The mandrels F and F' are alike in construction and each is provided with a head $F^2$ for engaging the end of the can body C opposite the one receiving the can head $C'$. Each head $F^2$ is secured on a shaft $F^3$ mounted to turn and slide horizontally in suitable bearings on the main frame A. Each of the two shafts $F^3$ carries a gear wheel $F^4$ in mesh with an idler gear wheel $F^5$ mounted to turn on a stud secured in the main frame A, the width of this gear wheel $F^5$ being somewhat in excess of that of the gear wheels $F^4$, so that the latter can move horizontally with their shafts $F^3$ without moving out of mesh with the gear wheel $F^5$. The gear wheel $F^4$ for the shaft $F^3$ of the mandrel F' is in mesh at its top with a gear wheel $O^5$ secured on the main driving shaft O. Thus when the machine is in operation and the driving shaft O rotates, it transmits a rotary motion by the gear wheel $O^5$ to the gear wheel $F^4$ for the shaft $F^3$ of the mandrel F', and as this gear wheel is in mesh with the idler gear wheel $F^5$ and the latter meshes with the gear wheel $F^4$ on the shaft $F^3$ for the mandrel F, it is evident that both mandrels F and F' are simultaneously and uniformly rotated.

In order to impart a horizontal sliding motion to the shafts $F^3$ a transversely extending shifter bar $F^6$ is employed and engages shifting collars $F^7$ secured on the shafts $F^3$, and this shifter bar $F^6$ is hung at its ends in arms $F^8$ secured to a rock shaft $F^9$ journaled in suitable bearings on the main frame A. The rock shaft $F^9$ is provided with an arm $F^{10}$ pivotally connected by a link $F^{11}$ with a horizontally extending lever $F^{12}$ fulcrumed on the main frame A, and the said lever $F^{12}$ is provided at its front end with a friction roller engaging a cam groove in a cam disk $F^{13}$ attached to the cam shaft P. When the machine is in operation and the cam shaft P rotates then the cam $F^{13}$ imparts a rocking motion to the lever $F^{12}$, which by the link $F^{11}$ imparts a swinging motion to the arm $F^{10}$, thus rocking the shaft $F^9$. The motion of the rock shaft $F^9$ causes a swinging of the arms $F^8$, whereby the shifter bar $F^6$ is moved horizontally, to shift the shafts $F^3$ forward and backward and consequently the mandrels F, F', so that the faces of the heads $F^2$ of the mandrels move in contact with the edges of the can bodies.

The spindles H and H' are also alike in construction and operation, and hence it is sufficient to describe but one in detail.

Each of the spindles H and H' is provided with a spindle head $H^2$ (see Figs. 7 and 10) attached to the horizontally disposed shaft $H^3$ mounted to turn in suitable bearings in the main frame A but held against sliding movement therein. On the shafts $H^3$ of the two spindles H and H' are secured the gear wheels $O^6$ and $O^2$ in mesh with the gear wheel $N^{18}$ previously mentioned and secured on the shaft $N^{17}$, so that when the main shaft O is rotated a simultaneous rotary motion is given to the shafts $H^3$ of the two spindles H and H' so as to run the same in unison with the mandrels F and F'. The shafts $H^3$ of the mandrels H and H' are made hollow to receive push rods T, T' provided with heads $T^2$ adapted to engage the can head $C'$ at the center thereof, to push the can body C with the crimped or pressed seam free from the head $H^2$ and out of the cylinder $E^3$, the can body C sliding in the clamping ring $B^3$ of the platen B until the flange $C^4$ abuts against the left face of the platen (see Fig. 7.) The push rods T are reciprocated by a shifting bar $T^4$ (see Fig. 8) hung on arms $T^5$ secured to and depending from a rock shaft $T^6$ journaled in suitable bearings carried on the main frame A, and on the said rock shaft $T^6$ is secured an arm $T^7$ (see Fig. 3) connected by a link $T^8$ with a lever $T^9$ fulcrumed on the main frame, and having a friction roller engaging a cam groove in the face of a cam disk $T^{11}$ secured on the cam shaft P. Thus when the machine is in operation and the cam shaft P is rotated the cam disk $T^{11}$ imparts a swinging motion to the lever $T^9$, and by the link $T^8$ and arm $T^7$ causes a rocking of the rock shaft $T^6$, which by the arms $T^5$ and the shifting bar $T^4$ causes the push rods T and T' to slide in the shafts $H^3$ while the latter are rotating.

The crimping roller I and the compressing roller J are mounted to turn on the bell crank levers I', J', respectively fulcrumed on horizontally disposed pins U and U' carried by the main frame A. The bell crank levers I' and J' have yielding spring-pressed connections with levers $I^2$, $J^2$, and for this purpose the bell crank levers I', J' are pivotally connected with links $I^3$, $J^3$ having sliding connections with links $I^4$, $J^4$ pivoted to the levers $I^2$, $J^2$, respectively, and between adjustable cross-heads in the said links $I^3$, $I^4$ and $J^3$, $J^4$ are interposed the springs $I^5$, $J^5$. The levers $I^2$, $J^2$ are fulcrumed on the main frame and carry at their free ends friction rollers I⁶, J⁶ engaging grooves in cam disks I⁷, J⁷ secured on the cam shaft P. Thus when the machine is in motion and the cam shaft P is rotated the cam disks I⁷, J⁷ simultaneously impart a swinging motion to the levers I², J² whereby the yielding connections mentioned are moved up and down together, to impart a swinging motion to the bell crank levers I', J', to move the crimping roller I against the flanges of the assembled body C and can head C', to form a double seam, and at the same time the compressing roller J presses the double seam of the crimped can and renders the seam completely airtight, without requiring packing of any kind to prevent leakage when the can is used. The construction and operation of the crimping roller I and the compressing roller J is the same as described in the Letters Patent of the United States above referred to, so that further detail description of the same is not deemed necessary, it, however, being understood that when the machine is in operation a can after being crimped by the roller I is moved during the next two-eighths of a revolution of the platen B to the compressing roller J, for compressing the seam C⁴ made by the crimping roller I, which latter has its peripheral surface formed with an annular groove (see Fig. 9) to cause the flanges C³, C² to turn downward and inward with the wider flange C³ on the outside of the flange C², the latter doubling up to form a double seam C⁴. This double seam C⁴ is subjected to greater pressure by the compressing roller J which has a straight peripheral face (see Fig. 5). The can thus finished is during the next one-eighth revolution brought to the ejecting device K which removes the finished can from the platen B.

The pivot pins U, U' above mentioned are each held on a plate U² held vertically adjustable on the frame A by a screw rod U³ mounted to turn in a suitable bearing U⁴ attached to the frame A (see Fig. 5). Now by turning the screw rod U³ by a wrench or like tool the plate U² and pivot U or U' can be raised or lowered to bring the crimping roller I or the compressing roller J in proper relation to the can body and can head flanges C², C³. When the desired adjustment is made the plate U² is permanently fastened in place by tap bolts U⁵ extending through elongated slots U⁶ in the plate U² and screwing in the main frame A.

In order to bring the center of the clamping rings B³ of the platen B in accurate alinement with the mandrels F, F' and the spindles H, H' a locking device is provided consisting essentially of a bell crank lever V fulcrumed on the bracket A' and having a lug V' engaging a corresponding notch B⁴ in the peripheral surface of the platen B. The bell crank lever V is connected by a link V² (see Fig. 5) with an arm V³ secured on the rock shaft V⁴ journaled in suitable bearings on the main frame A. On the rock shaft V⁴ is secured an arm V⁵ carrying a friction roller V⁶ engaging a cam groove in a cam disk V⁷ secured on the cam shaft P, so that when the latter is rotated the said cam disk V⁷ imparts a swinging motion to the arm V⁵ to rock the shaft V⁴, thus causing the arm V³ and link V² to impart a swinging motion to the bell crank lever V. By this movement of the bell crank lever V its lug V' is moved in and out of engagement with the corresponding notch B⁴, that is, during the period of rest of the platen B, the lug V' and immediately previous to imparting an intermittent rotary motion to the platen B. The said bell crank lever V is extended so as to move the lug V' out of engagement with the notch B⁴, to unlock the platen B and allow the same to turn one-eighth of a revolution so as to bring the next following notch opposite the lug V'.

The operation is as follows: When the platen B is at rest the several parts are in the position shown in Figs. 1-7 with the lowermost can body C in the chute D' in position to be pushed by the head D⁶ into the first notch B² of the platen and with a can body and can head in the second notch B² of the platen for crimping, and the lowermost can head C' in the chute E', to be next pushed into the end of the chute by the push head E⁴. At the same time a crimped can is in the top notch B² of the platen and another crimped can is in the notch B² at the compressing device and a finished can is opposite the ejecting device K to be pushed out of the notch B² by the push head K³. The mandrels F, F' and spindles H, H' are now rotating and the crimping roller I engages the flanges C² and C³ of the can body at the crimping device, to crimp the said flanges and form a double seam. At the same time the double seam of the crimped can at the compressing device is pressed by the compressing roller J so as to render the seam airtight, it being understood that during the crimping and compressing operations the can bodies and their heads are revolved at a high speed while the crimping roller I and the compressing roller J are held with a uniform pressure against the seam of the can. While this takes place the push heads D⁶ and K³ are moved simultaneously from the right to the left, so that the lowermost can body C in the chute D' is pushed into the front notch B² of the platen by the push head D⁶, and the finished can is pushed by the push head K³ from the rearmost notch B² into the guideway K⁴, which delivers the finished can to one side of the machine. The push heads D⁶ and K³ then immediately return to their normal position of rest.

After the crimping and compressing operations are completed the rollers I and J move out of contact with the seams C⁴ of the corresponding cans and then the pusher rods T, T' are caused to slide from the left to the right, to shift the cans bodily in the corresponding retaining rings B³ of the platen B until the seams C⁴ abut against the left face of the platen B. It is understood that when a can body C' reaches the crimping device the mandrel F first shifts or pushes the can body C from the right to the left so that the left end of the can body C enters the end of the chute, as previously explained, and when a can reaches the compressing device the mandrel F' pushes the can from the right to the left until the can head C' is engaged by the spindle H', the can body being then rotated by the mandrel F and spindle H at the crimping device.

When the crimping and compressing action is completed the platen B is unlocked by disengaging the lug V' from the notch B⁴, after which an intermittent rotary motion is given to the platen B, and the latter is again locked in place after it has made one-eighth revolution by the lug V' engaging the next notch B⁴. The above-described operation is again repeated.

The faces of the mandrel heads F² may be plain, as shown in Fig. 7, or provided with circular offsets F¹⁴ and F¹⁵ (see Figs. 13 and 14). The offset F¹⁴ is for use on can bodies open at both ends and is adapted to pass into the can body C, to hold the same in a central position relative to the spindles H, H'. The offset F¹⁵ is used on cans already closed by a head C' on the right hand end, and this offset F¹⁵ is recessed to fit an offset on the can head C' of a can for holding the latter in a central position relative to the spindles H, H'.

Having thus described my invention, I claim as new and desire to secure by Letters Patent:

1. In a can capping and compressing machine, comprising a vertically disposed intermittently rotating platen having retainers in its peripheral surface to receive and support the can bodies horizontally, of a can body feeding mechanism for periodically delivering the can bodies to the said retainers, said feed mechanism comprising a chute, a slide movable through the bottom of the chute and provided with a curved bar for engaging the lowermost body and with a rearward projection at the top of the bar for supporting the remaining bodies during the removal of the lowermost one, an ejecting mechanism comprising a curved push bar for engaging the body on the opposite side of the platen wheel from the feed mechanism, means for operating said feed mechanism, a connection between the feed mechanism and the ejecting mechanism, whereby the feed mechanism will operate said ejecting mechanism, means for feeding can heads to the bodies, and means for securing the heads to the bodies.

2. In a can capping and compressing machine, comprising a vertically disposed intermittently rotating platen having retainers in its peripheral surface to receive and support the can bodies horizontally, of a can body feeding mechanism comprising a chute, a slide movable through the bottom of the chute and provided with a curved bar for engaging the lowermost body, and with a rearward projection at the top of the bar for supporting the remaining bodies during the removal of the lowermost one, an ejecting mechanism for engaging the bodies on the opposite side of the platen wheel from the feed mechanism, means for operating said feed mechanism, a connection between the feed mechanism and the ejecting mechanism, whereby the feed mechanism will operate said ejecting mechanism, means for feeding can heads to the bodies, and means for securing the heads to the bodies.

3. In a can capping and compressing machine, comprising a vertically disposed intermittently rotating platen having retainers in its peripheral surface to receive and support the can bodies, of a can body feeding mechanism for periodically delivering the bodies to the said retainers, said feed mechanism comprising a chute, a slide movable through the bottom of the chute and provided with a curved bar for engaging and supporting the lowermost body, means in connection with the bar for supporting the remaining bodies during the removal of said lowermost one, an ejecting device for engaging the bodies on the opposite side of the platen wheel, means for operating said feed device and said ejecting device in unison, means for feeding can heads to the bodies, and means for securing the heads to the bodies.

4. In a can capping and compressing machine, comprising an intermittently rotating platen having retainers in its peripheral surface to receive and support the can bodies, of a can body feeding mechanism for periodically delivering the can bodies to the said retainers, comprising a chute for receiving the bodies, a slide movable through the bottom of the chute, said slide having a curved bar for engaging the can body, and a rearward extension at the top of the bar for supporting the can bodies in the chute during the removal of the lowermost body, means for operating the slide at predetermined intervals, means for feeding caps to the bodies, and means for securing the caps to the bodies.

5. In a can capping and compressing machine, comprising a vertically disposed intermittently rotating platen having retainers in its peripheral surface to receive and support the can bodies horizontally, a can body feeding mechanism for periodically delivering the can bodies to the said retainers, a can head feeding mechanism for periodically feeding a can head to the end of a can body in a retainer, said mechanism comprising a vertical chute for receiving the can heads, said chute having a lateral extension provided with a stop at the lower end thereof and with a side opening adapted to register with a retainer of the platen, a push head movable through the lateral extension and provided at its upper end with an arm for supporting the upper can heads when the lower head is removed, means for moving the can body through the retainer into contact with the head, means for securing the head to the body, and means for operating the head feeding means.

6. In a can capping and compressing machine, a vertically disposed intermittently rotating platen having retainers in its peripheral surface to receive and support can bodies, a can body feeding mechanism for periodically feeding can bodies to the said retainers, a can head feeding mechanism for periodically feeding a can head to the end of a can body in a retainer, said mechanism comprising a chute for receiving the can heads, said chute having a lateral extension provided with a stop at the lower end thereof, and a side opening adapted to register with a retainer of the platen, a push head movable through the lateral extension for removing the lowermost head, means for moving the can body through the retainer into contact with the head, means for securing the head to the body, and means for operating the head feeding means.

7. In a can capping and compressing machine, a can head feeding mechanism, comprising a vertical chute having a lateral extension terminating in a stop and provided with side openings and a push head movable through the lateral extension and provided with an arm for supporting the upper can heads when the lower head is removed.

8. In a can capping and compressing machine, the combination with a retainer for the can body, of a can head feeding mechanism, comprising a chute having a lateral extension terminating in a stop and being provided with side openings, adapted to register with the retainer, a push head movable through the lateral extension for removing the lowermost head and means for moving the can body through the retainer into contact with the head.

In testimony whereof I have signed my name to this specification in the presence of two subscribing witnesses.

HENRY LOUIS GUENTHER.

Witnesses:
   HENRY H. UNRUH,
   MARY E. DU BOIS.